United States Patent
Shibata et al.

(10) Patent No.: US 6,960,407 B2
(45) Date of Patent: Nov. 1, 2005

(54) FUEL CELL

(75) Inventors: Soichi Shibata, Hirakata (JP); Hiroki Kusakabe, Sakai (JP); Kazuhito Hatoh, Osaka (JP); Nobuhiro Hase, Mino (JP); Shinsuke Takeguchi, Kadoma (JP); Hideo Ohara, Katano (JP); Toshihiro Matsumoto, Takatsuki (JP); Katsuzou Kokawa, Nara (JP); Takayuki Urata, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/635,692

(22) Filed: Aug. 6, 2003

(65) Prior Publication Data

US 2004/0058223 A1 Mar. 25, 2004

(30) Foreign Application Priority Data

Aug. 7, 2002 (JP) .................................. 2002-230538

(51) Int. Cl.⁷ .............................................. H01M 4/86
(52) U.S. Cl. ...................................................... 429/44
(58) Field of Search ............................. 429/30, 40, 34, 429/41, 44

(56) References Cited

U.S. PATENT DOCUMENTS

| 6,007,933 | A | 12/1999 | Jones |
| 2003/0003345 | A1 * | 1/2003 | Ohara et al. .................. 429/38 |
| 2003/0211376 | A1 * | 11/2003 | Hatoh et al. .................. 429/32 |

* cited by examiner

Primary Examiner—Patrick Joseph Ryan
Assistant Examiner—Melissa Austin
(74) Attorney, Agent, or Firm—Akin Gump Strauss Hauer & Feld, LLP

(57) ABSTRACT

A fuel cell having high operation performance and reliability is provided by optimizing the shape and properties of a gas diffusion layer and the dimensions of a gas flow channel. The fuel cell evenly supplies a reaction gas to the catalyst of a catalyst layer and promptly discharges excessive water generated therein. The gas diffusion layer of the MEA comprises a first section having a surface A coming in direct contact with a separator plate and a second section having a surface B facing the gas flow channel of the separator plate. The porosity of the first section is lower than the porosity of the second section, and the second section protrudes into the gas flow channel, which has sufficient width and depth for the protrusion of the gas diffusion layer, and the width of a rib formed by the gas flow channel is sufficiently narrow.

6 Claims, 5 Drawing Sheets

FUEL CELL

BACKGROUND OF THE INVENTION

The present invention relates to a fuel cell that uses pure hydrogen or hydrogen reformed from methanol or fossil fuels as a fuel or that directly uses liquid fuel such as methanol, ethanol or dimethyl ether, together with air or oxygen as an oxidant. The present invention particularly pertains to a fuel cell comprising a solid polymer electrolyte.

A conventional electrode for polymer electrolyte fuel cells is composed of a catalyst layer which comes in contact with a polymer electrolyte membrane and a gas diffusion layer provided on the outer surface of the catalyst layer. The gas diffusion layer has three major functions. The first one is a function of diffusing a reaction gas for evenly supplying the reaction gas such as a fuel gas or an oxidant gas to the catalyst of the catalyst layer from a gas flow channel formed on the outer side of the gas diffusion layer. The second is a function of promptly discharging water produced by the reaction at the catalyst layer into the gas flow channel. The third is a function of conducting electrons required or generated by the reaction. Therefore, the gas diffusion layer must have high properties in terms of reaction gas permeability, water permeability and electronic conductivity.

Conventionally, the gas diffusion layer has a porous structure to have the gas permeability, and contains a water-repellent polymer, such as fluorocarbon resin, which is dispersed for suppressing water clogging (flooding), to have the water permeability. Also, the gas diffusion layer is conventionally made of an electron conductive material, such as carbon fiber, metal fiber or carbon fine powder, to have the electronic conductivity.

As a material having the three functions, carbon paper is conventionally used for the gas diffusion layer. However, the use of carbon paper for the gas diffusion layer of a fuel cell invites flooding when the relative humidities of the fuel gas and the oxidant gas become 98% or higher, so that the voltage of the fuel cell is lowered, resulting in unstable operation. This is due to the high gas diffusibility of carbon paper which increases the proportion of an underflow of the reaction gas. The underflow of the reaction gas is a flow of the reaction gas through the gas diffusion layer under the rib formed by the gas flow channel of a separator plate, and when the proportion of the underflow is increased, the pressure loss of the reaction gas is reduced, thereby impairing the water permeability. Thus, if the flow rate of the reaction gas is increased to heighten the pressure loss of the reaction gas, stable operation becomes possible, but this also causes a decrease in efficiency of the fuel cell.

On the other hand, a fuel cell using carbon fiber non-woven fabric for the gas diffusion layer is capable of stable operation even when the relative humidities of the fuel gas and the oxidant gas are 98% or higher. It is noted, however, that the voltage of such a fuel cell is lower than that of the fuel cell using carbon paper. The fuel cell using carbon fiber non-woven fabric is resistant to the flooding even at high degrees of humidification of the supplied gases because of the following reason. Due to the clamping pressure of the assembled fuel cell stack, the carbon fiber non-woven fabric is compressed as a whole, so that the gas permeability of the carbon fiber non-woven fabric is lowered, resulting in a decreased proportion of the underflow and a high pressure loss. However, the lowered gas permeability also causes a decrease in discharge performance of the fuel cell.

The present invention solves these problems and aims to provide an electrode for use in fuel cells which ensures gas diffusibility and excessive water permeability of a gas diffusion layer.

The present invention also aims to provide a fuel cell having high discharge performance and stability particularly in power generation under highly humidified conditions by reducing the proportion of an underflow while ensuring the porosity of the gas diffusion layer necessary for gas diffusion.

BRIEF SUMMARY OF THE INVENTION

The present invention provides a fuel cell comprising: a polymer electrolyte membrane; an anode and a cathode sandwiching the polymer electrolyte membrane; and an anode-side separator plate and a cathode-side separator plate sandwiching the anode and the cathode, the anode-side separator plate having a gas flow channel for supplying a fuel gas to the anode, the cathode-side separator plate having a gas flow channel for supplying an oxidant gas to the cathode, wherein each of the anode and the cathode comprises a catalyst layer and a gas diffusion layer, the gas diffusion layer comprises a first section having a surface A that comes in direct contact with the anode-side or cathode-side separator plate and a second section having a surface B that faces the gas flow channel of the anode-side or cathode-side separator plate, the porosity of the first section is lower than the porosity of the second section, and the second section protrudes into the gas flow channel.

In the fuel cell of the present invention, while the porosity of the second section (the portion of the gas diffusion layer that faces the gas flow channel) is ensured, the porosity of the first section (the portion of the gas diffusion layer that comes in contact with the rib formed by the gas flow channel) is lowered by compressing the first section. Accordingly, the gas diffusibility of the compressed first section is lowered, so that the proportion of the underflow is reduced. This makes it possible to provide a fuel cell having excellent cell performance and stability.

Further, due to the compression, the gas diffusion layer partially becomes swollen toward the gas flow channel, and the second section protrudes into the gas flow channel. Such shape of the second section increases the contact area of the gas diffusion layer and the reaction gas flowing through the gas flow channel. Therefore, the reaction gas can easily enter the gas diffusion layer, leading to an improvement of the gas diffusibility. This makes it possible to provide a fuel cell having excellent cell performance.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
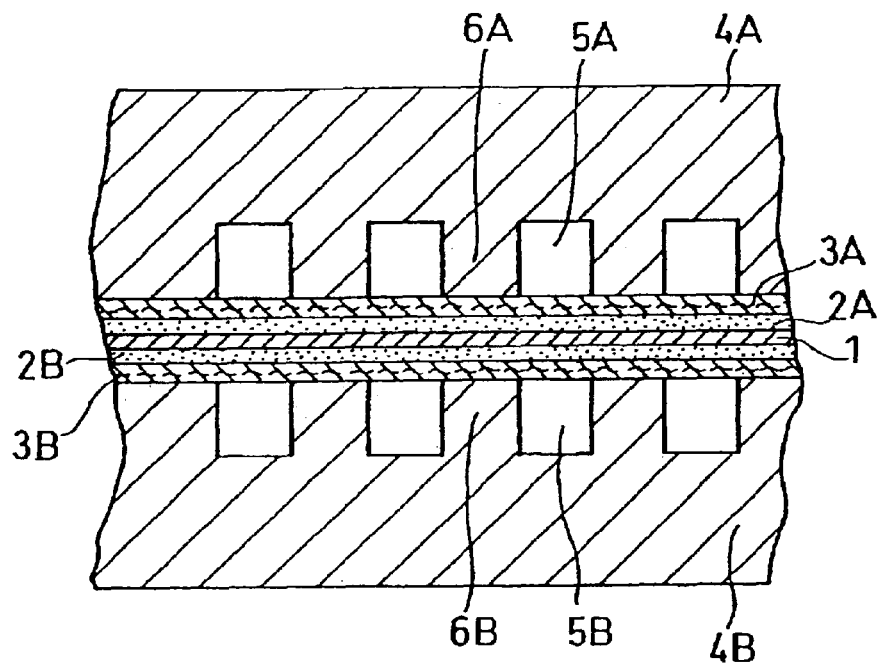
FIG. 1 is a sectional view of the main part of a unit cell of a conventional polymer electrolyte fuel cell.

In the fuel cell of the present invention, the gas diffusion layer of the electrode comprises a first section having a surface A that comes in direct contact with the separator plate and a second section having a surface B that faces the gas flow channel of the separator plate, the porosity of the first section is lower than the porosity of the second section, and the second section protrudes into the gas flow channel. This makes it possible to lower the gas permeability of the first section of the gas diffusion layer while retaining the porosity of the second section.

In the following, the porosity of the gas diffusion layer will be more specifically described.

With respect to the porosity of the first section, if it is almost 0%, the underflow can be eliminated. In this case, however, the electrode reaction does not occur at the first section due to the lack of the reaction gas. Since the surface A constitutes a large proportion of the total area of the electrode surface, the power generating performance of the fuel cell is significantly impaired. On the other hand, as the porosity of the first section becomes closer to that of the second section, the proportion of the underflow increases, so that the flow rate of the reaction gas flowing through the gas flow channel is decreased, resulting in deterioration of flooding-resistant performance.

The inventors of the present invention have conducted various experiments on the porosity of the gas diffusion layer and found that the fuel cell is capable of stable and highly efficient operation when the ratio of the porosity "a" of the first section to the porosity "b" of the second section (a/b ratio) is in a range of 0.20 to 0.85, as described in the following examples. The a/b ratio is more preferably 0.4 to 0.5.

When the cross-sectional shape of the second section of the gas diffusion layer protruding into the gas flow channel of the separator plate is arc-shaped, the contact area of the gas diffusion layer and the reaction gas flowing through the gas flow channel can be increased. This produces the effect of facilitating the diffusion of the reaction gas into the gas diffusion layer. Too little protrusion of the gas diffusion layer into the gas flow channel produces no effect, whereas too much protrusion causes a decrease in the cross-sectional area of the gas flow channel. When the gas diffusion layer protrudes into the gas flow channel by 0.10 to 0.25 mm, good gas diffusion can be obtained.

In the case where the gas diffusion layer protrudes into the gas flow channel, if the cross-sectional area of the gas flow channel is extremely small, the pressure loss of the reaction gas increases sharply, thereby posing a problem regarding the strength of the materials constituting the fuel cell. On the other hand, this decreases the proportion of the underflow, so that the electrode reaction is hindered under the rib of the separator plate, resulting in a decrease in cell performance. From these points, in the case where the gas diffusion layer protrudes into the gas flow channel, the gas flow channel needs to have a cross-sectional area larger than a certain level, and the width of the rib is desirably narrower.

In view of the above, it is preferable that the gas flow channel of the separator plate have a width of 1.0 to 2.0 mm and a depth of 1.0 to 2.0 mm and that the rib formed by the gas flow channel have a width of 0.5 to 1.0 mm. Such dimensions of the gas flow channel can eliminate the adverse effects of the change in cross-sectional area of the gas flow channel and the decrease in reaction area under the rib caused by the protrusion of the gas diffusion layer into the gas flow channel.

In the following, embodiments of the present invention will be described.

FIG. 1 illustrates the structure of the main part of a conventional polymer electrolyte fuel cell. A polymer electrolyte membrane 1 is sandwiched by catalyst layers 2A and 2B, and gas diffusion layers 3A and 3B are provided on the outer surfaces of the catalyst layers 2A and 2B, respectively. The resultant assembly is sandwiched by separator plates 4A and 4B having gas flow channels 5A and 5B, respectively. 6A and 6B are ribs formed between the gas flow channels.

The electrode reaction takes place at the catalyst surfaces of the catalyst layers 2A and 2B. For example, an anode reaction gas is supplied to the catalyst layer 2A though the gas diffusion layer 3A from the gas flow channel 5A of the separator plate 4A, while a cathode reaction gas is supplied to the catalyst layer 2B though the gas diffusion layer 3B from the gas flow channel 5B of the separator plate 4B. The reaction represented by formula (1) takes place at the anode catalyst layer 2A, while the reaction represented by formula (2) takes place at the cathode catalyst layer 2B. Formula (3) represents the total reaction.

$$H_2 \rightarrow 2H^+ + 2e^- \tag{1}$$

$$\tfrac{1}{2}O_2 + 2H^+ + 2e^- \rightarrow H_2O \tag{2}$$

$$H_2 + \tfrac{1}{2}O_2 \rightarrow H_2O + Q \tag{3}$$

This reaction produces electromotive force, whereby electric power is generated. Simultaneously, water is generated at the cathode catalyst layer 2B. In the electromotive reaction, $H^+$ ions generated at the anode catalyst layer 2A diffuse through the polymer electrolyte membrane 1 to the cathode catalyst layer 2B.

During the diffusion of the $H^+$ ions through the membrane, one $H^+$ ion is accompanied by 5 to 20 $H_2O$ molecules, and hence water is also transferred with the $H^+$ ions diffusing through the membrane. Since the polymer electrolyte membrane is capable of exhibiting high $H^+$ ion conductivity only in the presence of sufficient water, it is necessary to constantly supply water to the membrane to avoid shortage of water.

Water is supplied in the form of steam to the polymer electrolyte membrane through the gas flow channels 5A and 5B and the gas diffusion layers 3A and 3B from inlet-side manifold apertures, for the reaction gases, of the separator plates. Of the water produced in the cathode catalyst layer, excessive water that is not necessary for the polymer electrolyte membrane is discharged from outlet-side manifold apertures through the gas diffusion layers 3A and 3B and the gas flow channels 5A and 5B of the separator plates.

As described above, it is important for the fuel cell to ensure the excessive-water discharging capability of the gas diffusion layers 3A and 3B as well as the gas diffusibility, and it is also necessary, in terms of the long-term reliability, to design the fuel cell such that the excessive water can be promptly discharged. The excessive water is pushed out or transferred through the gas flow channels 5A and 5B and the gas diffusion layers 3A and 3B by the reaction gases. Thus, the pressure losses of the reaction gases need to be maintained at high level in order to enhance the excessive-water discharging capability. However, when the gas diffusion layers have high gas permeability at their portions contacting the ribs 6A and 6B between the gas flow channels, the proportion of the underflow, which is a flow of the gas passing under the ribs, increases as illustrated in FIG. 2, causing a decrease in pressure loss of the reaction gas.

Figure 2:
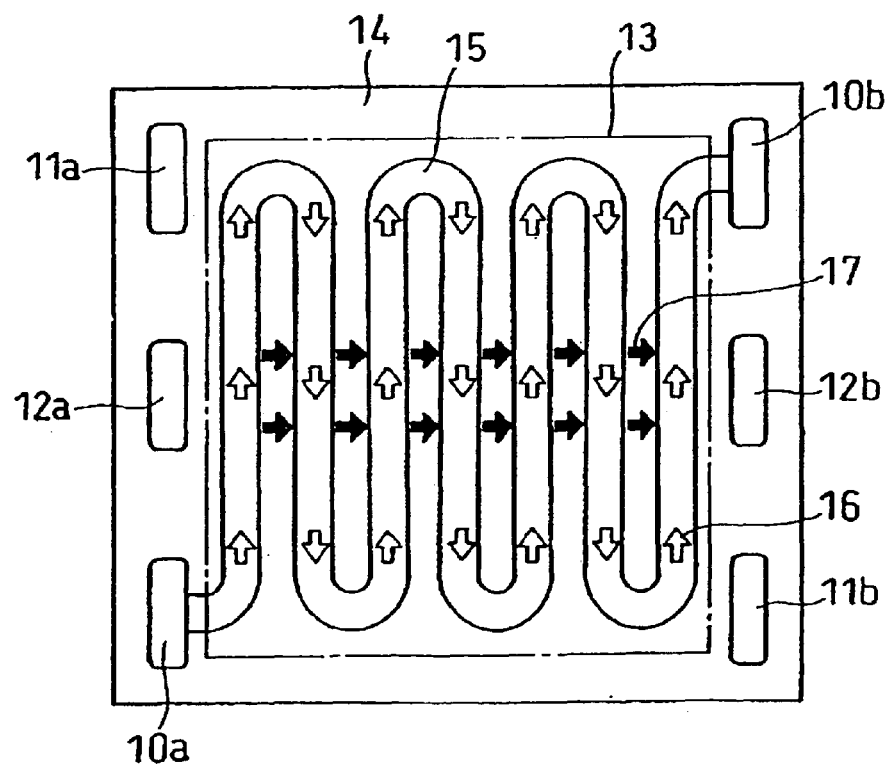
FIG. 2 is a front view of a separator plate showing an underflow of a reaction gas.

FIG. 2 is a front view of an anode-side separator plate 14. An anode is located at a section surrounded by a dash-dotted line 13. A fuel gas supplied from a fuel gas inlet-side manifold aperture 10a passes through a gas flow channel 15, which connects the manifold aperture 10a to an outlet-side manifold aperture 10b, and is discharged from the manifold aperture 10b. Arrows 16 of this figure show the flow of the gas passing through the gas flow channel 15, while arrows 17 show the underflow through the gas diffusion layer of the electrode under the rib of the separator plate. In FIG. 2, the gas flow channel is comprised of one groove, but it may be comprised of a plurality of parallel grooves. 11a and 11b are an inlet-side manifold aperture and an outlet-side manifold aperture, respectively, for an oxidant gas, and 12a and 12b are an inlet-side manifold aperture and an outlet-side manifold aperture, respectively, for cooling water.

According to, the present invention, the portion of the gas diffusion layer contacting the rib formed between the gas flow channels of the separator plate is compressed to lower the gas diffusibility and reduce the proportion of the underflow of the reaction gas, and at the same time, the portion of the gas diffusion layer facing the gas flow channel is allowed to protrude into the gas flow channel to maintain the porosity thereof at high level and avoid the deterioration of the gas diffusibility. In this way, the excessive water in the electrode can be discharged. Accordingly, it is possible to provide a fuel cell having high operation characteristics and reliability which is free from water clogging, flooding, and deterioration of gas diffusibility of the electrode. As described above, the use of the gas diffusion layer of the present invention makes it possible to provide a fuel cell having high operation characteristics and reliability.

It is noted that the porosity of a gas diffusion layer as used herein refers to the ratio of the total pore volume of the uncompressed gas diffusion layer which is measured using a nitrogen gas by a surface area and porosimetry analyzer (TriStar 3000 manufactured by Shimadzu Corporation) to the apparent volume of the gas diffusion layer. The porosity of the compressed gas diffusion layer is calculated from the change in thickness before and after the compression on the assumption that the true volume of the gas diffusion layer is constant.

In the following, embodiments of the present invention will be specifically described with reference to drawings. The structural drawings used are intended merely to facilitate understanding and are therefore not necessarily accurate in terms of relative size and positional relation of the respective elements.

Embodiment 1

Figure 3:
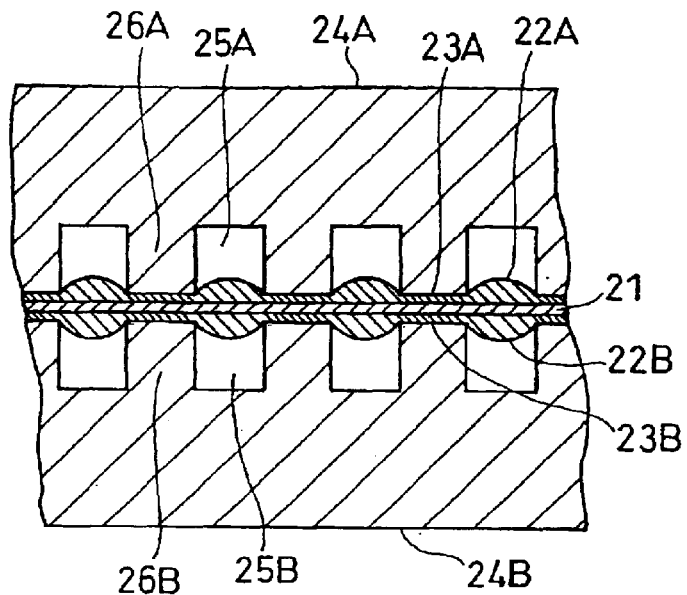
FIG. 3 is a sectional view of the main part of a unit cell in one example of the present invention.

FIG. 3 is a sectional view of the main part of a unit cell in this embodiment. 24A represents an anode-side separator plate having a gas flow channel 25A on its anode-facing side. Likewise, 24B represents a cathode-side separator plate having a gas flow channel 25B on its cathode-facing side. The gas flow channels 25A and 25B of these separator plates 24A and 24B are disposed at opposing positions except for an unavoidable portion. Ribs 26A and 26B are formed between the gas flow channels 25A and between the gas flow channels 25B, respectively.

A membrane electrode assembly (MEA) sandwiched between these two separator plates comprises a polymer electrolyte membrane 21 and a pair of electrodes, i.e., an anode and a cathode, sandwiching the polymer electrolyte membrane. Each of the electrodes comprises a catalyst layer which comes in contact with the polymer electrolyte membrane and a gas diffusion layer provided on the outer surface of the catalyst layer. In FIGS. 3 to 7, the electrode is illustrated as one layer. Of the electrode comprising the catalyst layer and the gas diffusion layer, only the gas diffusion layer is mainly compressed or swollen.

By appropriately setting the width and depth of the gas flow channel of the separator plate and the width of the rib between the gas flow channels and by adjusting the clamping pressure of the cell, electrode portions 22A and 22B of the gas diffusion layers facing the gas flow channels can be allowed to protrude into the gas flow channels 25A and 25B, and at the same time, electrode portions 23A and 23B of the gas diffusion layers sandwiched by the ribs 26A and 26B can be compressed.

According to this structure, the portion of the gas diffusion layer facing the gas flow channel can retain good gas diffusibility and water permeability, and moreover, the underflow of the gas can be reduced.

Embodiment 2

Figure 4:
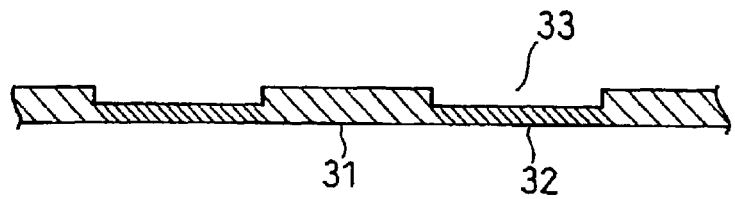
FIG. 4 is a partially sectional view of a gas diffusion layer in another example of the present invention.
Figure 5:
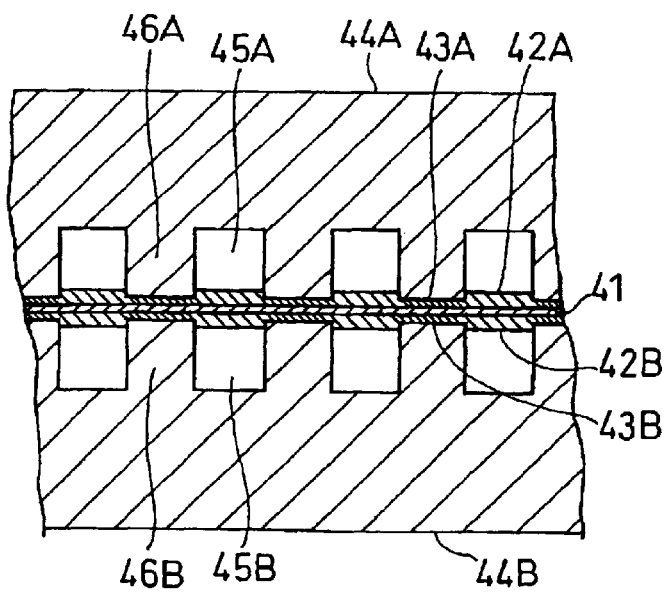
FIG. 5 is a sectional view of the main part of a unit cell comprising the gas diffusion layer of FIG. 4.

FIG. 4 is a sectional view of the main part of a gas diffusion layer in this embodiment, and FIG. 5 is a sectional view of a unit cell comprising the gas diffusion layer.

Carbon fiber non-woven fabric serving as a gas diffusion layer is pressed in advance by a corresponding separator plate to form an uncompressed portion 31 having a shape corresponding to that of the gas flow channel and a compressed portion 32. A recess 33 is formed on the surface of the compressed portion 32. An MEA incorporating such gas diffusion layers is sandwiched by a pair of separator plates to assemble a unit cell such that the ribs of the separator plates are fitted into the recesses 33 of the compressed portions 32 of the gas diffusion layers.

FIG. 5 illustrates such a unit cell. A polymer electrolyte membrane 41 is sandwiched by a pair of electrodes, i.e., an anode and a cathode. Each of the electrodes has a catalyst layer on the side opposite to the surface having the recess 33 of the gas diffusion layer. On the anode side, a compressed portion 43A of the gas diffusion layer is in contact with a rib 46A of a separator plate 44A, and an uncompressed portion 42A of the gas diffusion layer protrudes into a gas flow channel 45A. Likewise, on the cathode side, a compressed portion 43B of the gas diffusion layer is in contact with a rib 46B of a separator plate 44B, and an uncompressed portion 42B of the gas diffusion layer protrudes into a gas flow channel 45B.

In the foregoing embodiments, a unit cell comprising an MEA sandwiched by an anode-side separator plate and a cathode-side separator plate has been described, but a cell stack of a plurality of unit cells is normally used in a fuel cell. In such a cell stack, a separator plate having a fuel gas flow channel on one side and an oxidant gas flow channel on the other side, which serves both as an anode-side separator plate and a cathode-side separator plate, is inserted between the MEAs. Also, a cooling section is provided every one to three cells of the cell stack. The cooling section was formed by a composite separator plate consisting of an anode-side separator plate and a cathode-side separator plate each having a cooling water flow channel on the backside, the separator plates being joined together such that their cooling water flow channels faced each other.

In the following, examples of the present invention will be described.

EXAMPLE 1

First, a method of producing an electrode having a catalyst layer will be explained.

An electrode catalyst was prepared by placing 25% by weight of platinum particles having an average particle size of approximately 30 Å on an acetylene black powder. A dispersion of this catalyst powder in isopropanol was mixed with a dispersion of perfluorocarbon sulfonic acid powder in ethyl alcohol to form a catalyst paste.

Meanwhile, carbon fiber non-woven fabric having an external size of 16 cm×16 cm, a thickness of 0.36 mm, and a porosity of 74% (TGP-H-120 manufactured by Toray Industries, Inc.) was impregnated with an aqueous dispersion of fluorocarbon resin (NEOFLON ND1 manufactured by Daikin Industries, Ltd.), dried, and heated at 400° C. for 30 minutes in order to make it water-repellent. This serves as a gas diffusion layer. The catalyst paste was applied by screen printing onto one side of the carbon fiber nonwoven fabric to form a catalyst layer. The catalyst layer was partially embedded in the carbon fiber non-woven fabric. In this way, a pair of electrodes each comprising the catalyst layer and the carbon fiber non-woven fabric were prepared. In each of the electrodes, the content of platinum was 0.5 mg/cm$^2$, and the content of perfluorocarbon sulfonic acid was 1.2 mg/cm$^2$.

Subsequently, the pair of electrodes were bonded by hot pressing to the opposite sides of a proton conductive polymer electrolyte membrane having an external size of 20 cm×20 cm such that the catalyst layers were brought in contact with the electrolyte membrane, to fabricate a membrane electrode assembly (MEA). The proton conductive polymer electrolyte membrane was a thin film of perfluorocarbon sulfonic acid having a thickness of 50 μm. The MEA produced in the above manner was named MEA-1.

Next, a conductive separator plate will be described.

First, an artificial graphite powder having an average particle size of approximately 10 μm (50 parts by weight), fibrous graphite having an average diameter of 50 μm and an average length of 0.5 mm (30 parts by weight), and a thermosetting phenol resin (20 parts by weight) were mixed and kneaded with each other by an extrusion kneading machine. The mixture was charged into a die having a pattern for forming a gas flow channel, a cooling water flow channel and manifold apertures and was hot pressed. The hot pressing was performed at a die temperature of 150° C. and a pressure of 100 kgf/cm$^2$ for 10 minutes. The separator plate obtained had an external size of 20 cm×20 cm and a thickness of 3.0 mm, and the gas flow channel and the cooling water flow channel had a width of 1.0 mm and a depth of 1.0 mm. The rib formed between the flow channels had a width of 1.0 mm.

The MEA-1 sheet was sandwiched by an anode-side separator plate and a cathode-side separator plate produced in the above manner, to assemble a unit cell. A cell stack comprising these unit cells was clamped in a manner which will be described below. In this example, the cell stack was clamped such that the portion of the carbon fiber non-woven fabric (gas diffusion layer) contacting the rib of the separator plate had a thickness of 0.11 mm. Then, the porosity of the compressed portion of the carbon fiber non-woven fabric was 14.9%, and the ratio of the compressed portion to the uncompressed portion was 0.2. In this way, a unit cell as illustrated in FIG. 3 was produced. The carbon fiber non-woven fabric of the electrode protruded into the gas flow channel, at maximum, by 0.25 mm.

EXAMPLE 2

In the same manner as in Example 1, a separator plate having the following dimensions was produced. The separator plate had an external size of 20 cm×20 cm and a thickness of 3.0 mm, and the gas flow channel and the cooling water flow channel had a width of 2.0 mm, a depth of 2.0 mm, and a rib width of 0.5 mm. The MEA-1 sheet was sandwiched by the above-mentioned two separator plates, and the resultant was clamped such that the portion of the carbon fiber non-woven fabric contacting the rib of the separator plate had a thickness of 0.11 mm. Then, the porosity of the compressed portion of the carbon fiber non-woven fabric was 14.9%, and the ratio of the compressed portion to the uncompressed portion was 0.2. Due to the clamping, the carbon fiber non-woven fabric protruded into the gas flow channel, at maximum, by 0.25 mm, and had a cross-sectional shape similar to that of FIG. 3.

EXAMPLE 3

In the same manner as in Example 1, a separator plate having the following dimensions was produced. The separator plate had an external size of 20 cm×20 cm and a thickness of 3.0 mm, and the gas flow channel and the cooling water flow channel had a width of 1.0 mm, a depth of 1.0 mm, and a rib width of 1.0 mm. The MEA-1 sheet was sandwiched by the above-mentioned two separator plates, and the resultant was clamped such that the portion of the carbon fiber non-woven fabric contacting the rib of the separator plate had a thickness of 0.25 mm. Then, the porosity of the compressed portion of the carbon fiber non-woven fabric was 62.6%, and the ratio of the compressed portion to the uncompressed portion was 0.85. Due to the clamping, the carbon fiber non-woven fabric protruded into the gas flow channel, at maximum, by 0.11 mm, and had a cross-sectional shape similar to that of FIG. 3.

EXAMPLE 4

In the same manner as in Example 1, a separator plate having the following dimensions was produced. The separator plate had an external size of 20 cm×20 cm and a thickness of 3.0 mm, and the gas flow channel and the cooling water flow channel had a width of 1.0 mm, a depth of 1.0 mm, and a rib width of 0.5 mm. The MEA-1 sheet was sandwiched by the above-mentioned two separator plates, and the resultant was clamped such that the portion of the carbon fiber non-woven fabric contacting the rib of the separator plate had a thickness of 0.25 mm. Then, the porosity of the compressed portion of the carbon fiber non-woven fabric was 62.6%, and the ratio of the compressed portion to the uncompressed portion was 0.85. Due to the clamping, the carbon fiber non-woven fabric protruded into the gas flow channel, at maximum, by 0.11 mm, and had a cross-sectional shape similar to that of FIG. 3.

EXAMPLE 5

An MEA was produced in the same manner as in Example 1, except for the use of carbon fiber non-woven fabric (TGP-H-120 produced by Toray Industries, Inc.) having an external size of 16 cm×16 cm, a thickness of 0.36 mm, and a porosity of 90%. This MEA was named MEA-2.

In the same manner as in Example 1, a separator plate having the following dimensions was produced. The separator plate had an external size of 20 cm×20 cm and a thickness of 3.0 mm, and the gas flow channel and the cooling water flow channel had a width of 2.0 mm, a depth of 2.0 mm, and a rib width of 0.5 mm. The MEA-2 sheet was sandwiched by the above-mentioned two separator plates, and the resultant was clamped such that the portion of the carbon fiber non-woven fabric contacting the rib of the separator plate had a thickness of 0.11 mm. Then, the porosity of the compressed portion of the carbon fiber non-woven fabric was 67.3%, and the ratio of the compressed portion to the uncompressed portion was 0.75. Due to the clamping, the carbon fiber non-woven fabric protruded into the gas flow channel, at maximum, by 0.25 mm, and had a cross-sectional shape similar to that of FIG. 3.

EXAMPLE 6

In the same manner as in Example 1, a separator plate having the following dimensions was produced. The separator plate had an external size of 20 cm×20 cm and a thickness of 3.0 mm, and the gas flow channel and the cooling water flow channel had a width of 1.0 mm, a depth of 1.0 mm, and a rib width of 1.0 mm.

Next, a method of producing an electrode comprising a catalyst layer will be explained. First, 25% by weight of platinum particles having an average particle size of approximately 30 Å were placed on an acetylene black powder. A dispersion of this catalyst powder in isopropanol was mixed with a dispersion of perfluorocarbon sulfonic acid powder in ethyl alcohol to form a catalyst paste.

Meanwhile, as the base material of a gas diffusion layer, polyacrylonitrile fibers having a diameter of approximately 10 μm and a length of approximately 5 mm were dispersed in water and were made into a sheet. Subsequently, the sheet was impregnated with a phenol resin solution diluted to a concentration of 40% by weight with ethanol, and was dried at approximately 100° C. for 10 minutes to cure the resin. This sheet was heated under a nitrogen atmosphere at 2000° C. for 24 hours for graphitization, which produced a carbon paper having a thickness of 0.2 mm and a porosity of 80%. Thereafter, the carbon paper was immersed in a diluted solution which was a mixture of an aqueous dispersion of a water repellent (NEOFLON ND1 manufactured by Daikin Industries, Ltd.) and water in a weight ratio of 1:10, and was then dried at approximately 60° C. for 1 hour. Further, an aqueous dispersion of acetylene black and polytetrafluoroethylene (PTFE) in a weight ratio of 3:1 was prepared, and the aqueous dispersion was applied onto the carbon paper prepared in the above manner with a doctor blade to form a water repellent layer. This was dried at approximately 60° C. for 1 hour and baked at approximately 380° C. for 15 minutes. The carbon paper was cut such that its external size became 16 cm×16 cm.

The separator plate was placed on the carbon paper such that the carbon paper came in contact with the gas flow channel of the separator plate. Then, by the application of a pressure of 100 kgf/cm² per contact area of the separator plate and the carbon paper, the portion of the carbon paper contacting the rib of the separator plate was compressed to form the recess 33 having a depth of 0.1 mm as illustrated in FIG. 4. Then, the porosity of the compressed portion of the carbon paper was 60.0%, and the ratio of the compressed portion to the uncompressed portion was 0.75. The catalyst paste was applied by screen printing onto the other side of the carbon paper, i.e., on the surface having the water repellent layer, to form a catalyst layer. Then, the catalyst layer was partially embedded in the carbon paper. In this way, a pair of electrodes each comprising the catalyst layer and the carbon paper were prepared. In each of the electrodes, the content of platinum was 0.5 mg/cm², and the content of perfluorocarbon sulfonic acid was 1.2 mg/cm².

Thereafter, the pair of electrodes were bonded by hot pressing to the opposite sides of a proton conductive polymer electrolyte membrane having an external size of 20 cm×20 cm such that the catalyst layers were brought in contact with the electrolyte membrane, to fabricate a membrane electrode assembly (MEA). The same polymer electrolyte membrane as that of Example 1 was used. This MEA was named MEA-3.

The MEA-3 sheet was sandwiched by the above-mentioned two separator plates such that the compressed portions of the gas diffusion layers of the MEA aligned with the ribs of the separator plates, to assemble a unit cell as illustrated in FIG. 5. The clamping pressure was 15 kgf/cm² per unit area.

EXAMPLE 7

Using the same materials and procedure as those of Example 6, a carbon paper having a recess of 0.05 mm in depth was prepared. The porosity of the compressed portion of the carbon paper was 20.0% and the ratio of the compressed portion to the uncompressed portion was 0.25. Using the same materials and procedure as those of Example 6 except for the use of this carbon paper, an MEA was produced. This MEA was named MEA-4.

In the same manner as in Example 1, a separator plate having the following dimensions was produced. The separator plate had an external size of 20 cm×20 cm and a thickness of 3.0 mm, and the gas flow channel and the cooling water flow channel had a width of 1.0 mm, a depth of 1.0 mm, and a rib width of 1.0 mm. The MEA-4 sheet was sandwiched by the above-mentioned two separator plates such that the compressed portions of the gas diffusion layers of the MEA aligned with the ribs of the separator plates, to assemble a unit cell as illustrated in FIG. 5. The clamping pressure was 15 kgf/cm² per unit area.

EXAMPLE 8

Using the same procedure as that of Example 6 except for the use of polyacrylonitrile fibers having a diameter of 15 μm as the base material of the carbon paper, a carbon paper having a recess of 0.10 mm in depth was prepared. The carbon paper had a porosity of 70% before the compression. After the compression, the porosity of the compressed portion of the carbon paper was 40.0% and the ratio of the compressed portion to the uncompressed portion was 0.57. Using the same materials and procedure as those of Example 6 except for the use of this carbon paper, an MEA was produced. This MEA was named MEA-5.

In the same manner as in Example 1, a separator plate having the following dimensions was produced. The separator plate had an external size of 20 cm×20 cm and a thickness of 3.0 mm, and the gas flow channel and the cooling water flow channel had a width of 1.0 mm, a depth of 1.0 mm, and a rib width of 1.0 mm. The MEA-5 sheet was sandwiched by the above-mentioned two separator plates such that the compressed portions of the gas diffusion layers of the MEA aligned with the ribs of the separator plates, to assemble a unit cell as illustrated in FIG. 5. The clamping pressure was 15 kgf/cm² per unit area.

Comparative Example 1

In the same manner as in Example 1, a separator plate having the following dimensions was produced. The separator plate had an external size of 20 cm×20 cm and a thickness of 3.0 mm, and the gas flow channel and the cooling water flow channel had a width of 2.0 mm, a depth of 2.0 mm, and a rib width of 0.5 mm. The MEA-1 sheet was sandwiched by the above-mentioned two separator plates, and the resultant was clamped such that the portion of the carbon fiber non-woven fabric contacting the rib of the separator plate had a thickness of 0.11 mm. Then, the porosity of the compressed portion of the carbon fiber non-woven fabric was 6.4%, and the ratio of the compressed portion to the uncompressed portion was 0.09. Due to the clamping, the carbon fiber non-woven fabric protruded into the gas flow channel, at maximum, by 0.26 mm, and had a cross-sectional shape similar to that of FIG. 3.

Comparative Example 2

Figure 7:
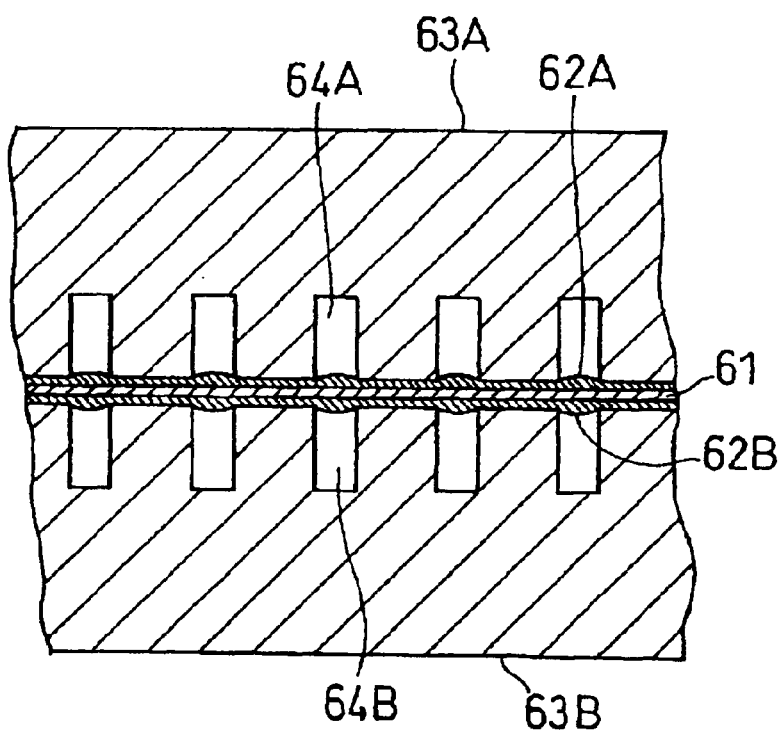
FIG. 7 is a sectional view of the main part of a unit cell in Comparative Example 2.

In the same manner as in Example 1, a separator plate having the following dimensions was produced. The separator plate had an external size of 20 cm×20 cm and a thickness of 3.0 mm, and the gas flow channel and the cooling water flow channel had a width of 0.5 mm, a depth of 1.0 mm, and a rib width of 1.0 mm. The MEA-1 sheet was sandwiched by the above-mentioned two separator plates, and the resultant was clamped such that the portion of the carbon fiber non-woven fabric contacting the rib of the separator plate had a thickness of 0.11 mm. Then, since the width of the gas flow channel was narrow, the carbon fiber non-woven fabric was compressed as a whole, protruding only a little into the gas flow channel by not more than 0.05 mm, as illustrated in FIG. 7. In FIG. 7, 61 represents a polymer electrolyte membrane sandwiched by an anode 62A and a cathode 62B, which protrude a little into the gas flow channels 64A and 64B of separator plates 63A and 63B, respectively.

Comparative Example 3

In the same manner as in Example 1, a separator plate having the following dimensions was produced. The separator plate had an external size of 20 cm×20 cm and a thickness of 3.0 mm, and the gas flow channel and the cooling water flow channel had a width of 1.0 mm, a depth of 0.5 mm, and a rib width of 1.0 mm. The MEA-1 sheet was sandwiched by the above-mentioned two separator plates, and the resultant was clamped such that the portion of the carbon fiber non-woven fabric contacting the rib of the separator plate had a thickness of 0.25 mm. Due to the clamping, the carbon fiber non-woven fabric protruded into the gas flow channel by 0.11 mm, and had a cross-sectional shape similar to that of FIG. 3.

Comparative Example 4

In the same manner as in Example 1, a separator plate having the following dimensions was produced. The separator plate had an external size of 20 cm×20 cm and a thickness of 3.0 mm, and the gas flow channel and the cooling water flow channel had a width of 1.0 mm, a depth of 1.0 mm, and a rib width of 2.0 mm. The MEA-1 sheet was sandwiched by the above-mentioned two separator plates, and the resultant was clamped such that the portion of the carbon fiber non-woven fabric contacting the rib of the separator plate had a thickness of 0.11 mm. Then, the porosity of the compressed portion of the carbon fiber non-woven fabric was 14.9%, and the ratio of the compressed portion to the uncompressed portion was 0.20. Due to the clamping, the carbon fiber non-woven fabric protruded into the gas flow channel by 0.25 mm, and had a cross-sectional shape similar to that of FIG. 3.

Comparative Example 5

In the same manner as in Example 1, a separator plate having the following dimensions was produced. The separator plate had an external size of 20 cm×20 cm and a thickness of 3.0 mm, and the gas flow channel and the cooling water flow channel had a width of 1.0 mm, a depth of 1.0 mm, and a rib width of 0.3 mm. The MEA-1 sheet was sandwiched by the above-mentioned two separator plates, and the resultant was clamped such that the portion of the carbon fiber non-woven fabric contacting the rib of the separator plate had a thickness of 0.25 mm. Then, the porosity of the compressed portion of the carbon fiber non-woven fabric was 62.6%, and the ratio of the compressed portion to the uncompressed portion was 0.85. Due to the clamping, the carbon fiber non-woven fabric protruded into the gas flow channel by 0.11 mm, and had a cross-sectional shape similar to that of FIG. 3.

Comparative Example 6

In the same manner as in Example 1, a separator plate having the following dimensions was produced. The separator plate had an external size of 20 cm×20 cm and a thickness of 3.0 mm, and the gas flow channel and the cooling water flow channel had a width of 2.0 mm, a depth of 2.0 mm, and a rib width of 0.5 mm. The MEA-2 sheet was sandwiched by the above-mentioned two separator plates, and the resultant was clamped such that the portion of the carbon fiber non-woven fabric contacting the rib of the separator plate had a thickness of 0.08 mm. Then, the porosity of the compressed portion of the carbon fiber non-woven fabric was 55.0%, and the ratio of the compressed portion to the uncompressed portion was 0.61. Due to the clamping, the carbon fiber non-woven fabric protruded into the gas flow channel by 0.28 mm, and had a cross-sectional shape similar to that of FIG. 3.

Comparative Example 7

In the same manner as in Example 1, a separator plate having the following dimensions was produced. The separator plate had an external size of 20 cm×20 cm and a thickness of 3.0 mm, and the gas flow channel and the cooling water flow channel had a width of 2.0 mm, a depth of 2.0 mm, and a rib width of 0.5 mm. The MEA-2 sheet was sandwiched by the above-mentioned two separator plates, and the resultant was clamped such that the portion of the carbon fiber non-woven fabric contacting the rib of the separator plate had a thickness of 0.25 mm. Then, the porosity of the compressed portion of the carbon fiber non-woven fabric was 85.6%, and the ratio of the compressed portion to the uncompressed portion was 0.95. Due to the clamping, the carbon fiber non-woven fabric protruded into the gas flow channel by 0.25 mm, and had a cross-sectional shape similar to that of FIG. 3.

Comparative Example 8

In the same manner as in Example 1, a separator plate having the following dimensions was produced. The separator plate had an external size of 20 cm×20 cm and a thickness of 3.0 mm, and the gas flow channel and the cooling water flow channel had a width of 2.0 mm, a depth of 2.0 mm, and a rib width of 0.5 mm. The MEA-2 sheet was sandwiched by the above-mentioned two separator plates, and the resultant was clamped such that the portion of the carbon fiber non-woven fabric contacting the rib of the separator plate had a thickness of 0.27 mm. Then, the porosity of the compressed portion of the carbon fiber non-woven fabric was 86.7%, and the ratio of the compressed portion to the uncompressed portion was 0.96. Due to the clamping, the carbon fiber non-woven fabric protruded into the gas flow channel by 0.09 mm, and had a cross-sectional shape similar to that of FIG. 3.

Comparative Example 9

An MEA was produced in the same manner as in Example 1, except for the use of carbon fiber non-woven fabric (TGP-H-120 produced by Toray Industries, Inc.) having an external size of 16 cm×16 cm, a thickness of 0.36 mm, and a porosity of 65%. This MEA was named MEA-6.

In the same manner as in Example 1, a separator plate having the following dimensions was produced. The separator plate had an external size of 20 cm×20 cm and a thickness of 3.0 mm, and the gas flow channel and the cooling water flow channel had a width of 2.0 mm, a depth of 2.0 mm, and a rib width of 0.5 mm. The MEA-6 sheet was sandwiched by the above-mentioned two separator plates, and the resultant was clamped such that the portion of the carbon fiber non-woven fabric contacting the rib of the separator plate had a thickness of 0.11 mm. Then, the porosity of the compressed portion of the carbon fiber non-woven fabric was 0.0%, and the ratio of the compressed portion to the uncompressed portion was 0.0. Due to the clamping, the carbon fiber non-woven fabric protruded into the gas flow channel, at maximum, by 0.25 mm, and had a cross-sectional shape similar to that of FIG. 3.

Comparative Example 10

In the same manner as in Example 1, a separator plate having the following dimensions was produced. The separator plate had an external size of 20 cm×20 cm and a thickness of 3.0 mm, and the gas flow channel and the cooling water flow channel had a width of 1.0 mm, a depth of 1.0 mm, and a rib width of 1.0 mm. The MEA-6 sheet was sandwiched by the above-mentioned two separator plates, and the resultant was clamped such that the portion of the carbon fiber non-woven fabric contacting the rib of the separator plate had a thickness of 0.30 mm. Then, the porosity of the compressed portion of the carbon fiber non-woven fabric was 58.0%, and the ratio of the compressed portion to the uncompressed portion was 0.89. Due to the clamping, the carbon fiber non-woven fabric protruded into the gas flow channel, at maximum, by 0.06 mm, and had a cross-sectional shape similar to that of FIG. 7.

Comparative Example 11

In the same manner as in Example 1, a separator plate having the following dimensions was produced. The separator plate had an external size of 20 cm×20 cm and a thickness of 3.0 mm, and the gas flow channel and the cooling water flow channel had a width of 1.0 mm, a depth of 1.0 mm, and a rib width of 1.0 mm.

As the base material of the gas diffusion layer, the carbon paper of Example 6 having the porosity of 80% was used. In the same manner as in Example 6, a water-repellent layer was formed on this carbon paper. The carbon paper was cut into an external size of 16 cm×16 cm, and the same catalyst paste as that of Example 1 was applied onto the side of the carbon paper having the water-repellent layer to form a catalyst layer. The catalyst layer was partially embedded into the carbon paper. In the same manner as in Example 1 except for the use of the electrodes thus produced, an MEA was produced. This MEA was named MEA-7.

Figure 6:
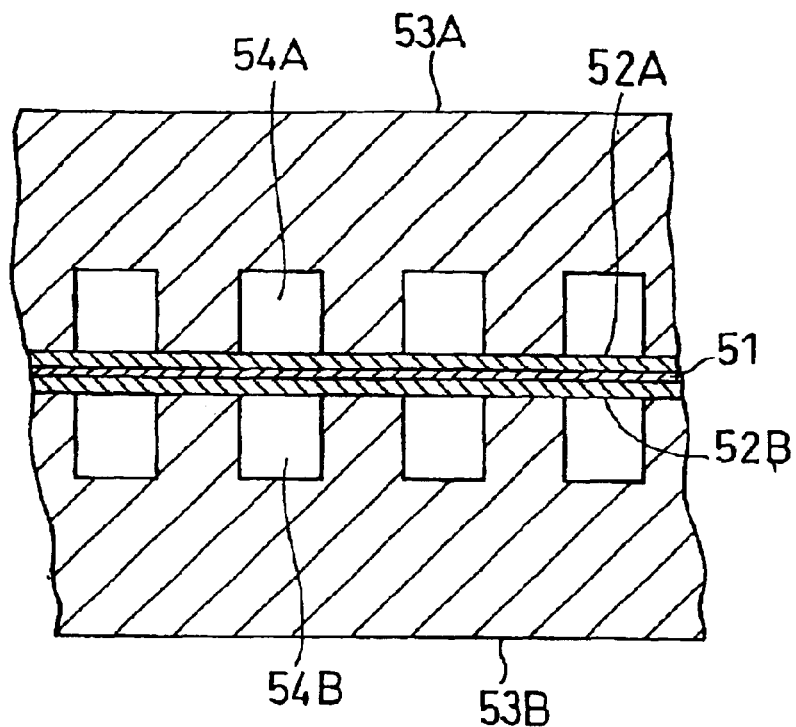
FIG. 6 is a sectional view of the main part of a unit cell in Comparative Example 1.

The MEA-7 sheet was sandwiched by the above-mentioned two separator plates, to assemble a unit cell as illustrated in FIG. 6. In FIG. 6, 51 represents a polymer electrolyte membrane. Of an anode 52A and a cathode 52B sandwiching the polymer electrolyte membrane, the portions of the gas diffusion layers facing gas flow channels 54A and 54B of separator plates 53A and 53B have almost the same shape and properties as the other portions of the gas diffusion layers.

Comparative Example 12

Using the same materials and procedure as those of Example 6, a carbon paper having a recess of 0.15 mm in depth was prepared. The porosity of the compressed portion of the carbon paper was 73.3% and the ratio of the compressed portion to the uncompressed portion was 0.92. Using the same materials and procedure as those of Example 6 except for the use of this carbon paper, an MEA was produced. This MEA was named MEA-8.

In the same manner as in Example 1, a separator plate having the following dimensions was produced. The separator plate had an external size of 20 cm×20 cm and a thickness of 3.0 mm, and the gas flow channel and the cooling water flow channel had a width of 1.0 mm, a depth of 1.0 mm, and a rib width of 1.0 mm. The MEA-8 sheet was sandwiched by the above-mentioned two separator plates such that the compressed portions of the gas diffusion layers of the MEA aligned with the ribs of the separator plates, to assemble a unit cell as illustrated in FIG. 5. The clamping pressure was 15 kgf/cm$^2$ per unit area.

Comparative Example 13

Using the same procedure as that of Example 6 except for the use of polyacrylonitrile fibers having a diameter of 15 μm as the base material of the carbon paper, a carbon paper having a recess of 0.15 mm in depth was prepared. The carbon paper had a porosity of 70% before the compression. After the compression, the porosity of the compressed portion of the carbon paper was 0.0% and the ratio of the compressed portion to the uncompressed portion was 0.0. Using the same materials and procedure as those of Example 6 except for the use of this carbon paper, an MEA was produced. This MEA was named MEA-9.

In the same manner as in Example 1, a separator plate having the following dimensions was produced. The separator plate had an external size of 20 cm×20 cm and a thickness of 3.0 mm, and the gas flow channel and the cooling water flow channel had a width of 1.0 mm, a depth of 1.0 mm, and a rib width of 1.0 mm. The MEA-9 sheet was sandwiched by the above-mentioned two separator plates such that the compressed portions of the gas diffusion layers of the MEA aligned with the ribs of the separator plates, to assemble a unit cell as illustrated in FIG. 5. The clamping pressure was 15 kgf/cm$^2$ per unit area.

Comparative Example 14

Using the same procedure as that of Example 6 except for the use of polyacrylonitrile fibers having a diameter of 15 μm as the base material of the carbon paper, a carbon paper having a recess of 0.05 mm in depth was prepared. The carbon paper had a porosity of 70% before the compression. After the compression, the porosity of the compressed portion of the carbon paper was 60.0% and the ratio of the compressed portion to the uncompressed portion was 0.86. Using the same materials and procedure as those of Example 6 except for the use of this carbon paper, an MEA was produced. This MEA was named MEA-10.

In the same manner as in Example 1, a separator plate having the following dimensions was produced. The separator plate had an external size of 20 cm×20 cm and a thickness of 3.0 mm, and the gas flow channel and the cooling water flow channel had a width of 1.0 mm, a depth of 1.0 mm, and a rib width of 1.0 mm. The MEA-10 sheet was sandwiched by the above-mentioned two separator plates such that the compressed portions of the gas diffusion layers of the MEA aligned with the ribs of the separator plates, to assemble a unit cell as illustrated in FIG. 5. The clamping pressure was 15 kgf/cm$^2$ per unit area.

Of each of the unit cells produced in Examples 1 to 8 and Comparative Examples 1 to 14, 100 unit cells were stacked to form a cell stack. A stainless steel current collector plate and an electrically insulating plate were joined to each end of the cell stack, and the resultant stack was sandwiched by end plates and was secured by clamping rods. In Examples 1 to 5 and Comparative Examples 1 to 10, the cell stack was clamped at a pressure which allowed the carbon fiber non-woven fabric to have the predetermined thickness. In Examples 6 to 8 and Comparative Examples 11 to 14, the cell stack was clamped at a pressure of 15 kgf/cm² per area of the separator plate. A cooling section was provided every two cells of the cell stack. The cooling section was formed by a composite separator plate consisting of a separator plate having a cooling water flow channel on one side and a fuel gas flow channel on the other side and a separator plate having a cooling water flow channel on one side and an oxidant gas flow channel on the other side, these two separator plates being joined together such that their cooling water flow channels faced each other. The separator plate inserted between the MEAs was, except the separator plate as the cooling section, a separator plate having a fuel gas flow channel on one side and an oxidant gas on the other side.

Each of the polymer electrolyte fuel cells produced in the above manner was retained at 75° C., while a hydrogen gas humidified and heated to have a dew point of 75° C. and air humidified and heated to have a dew point of 75° C. were supplied to the anode and the cathode, respectively. As a result, all of the fuel cells exhibited an open-circuit voltage of 95 to 96 V at the time of no load when current was not output to outside. Each of these fuel cells was subjected to a continuous power generation test under the conditions of a fuel utilization of 85%, oxygen utilization of 50%, and current density of 0.7 A/cm² to measure changes in output characteristics with passage of time.

Figure 8:
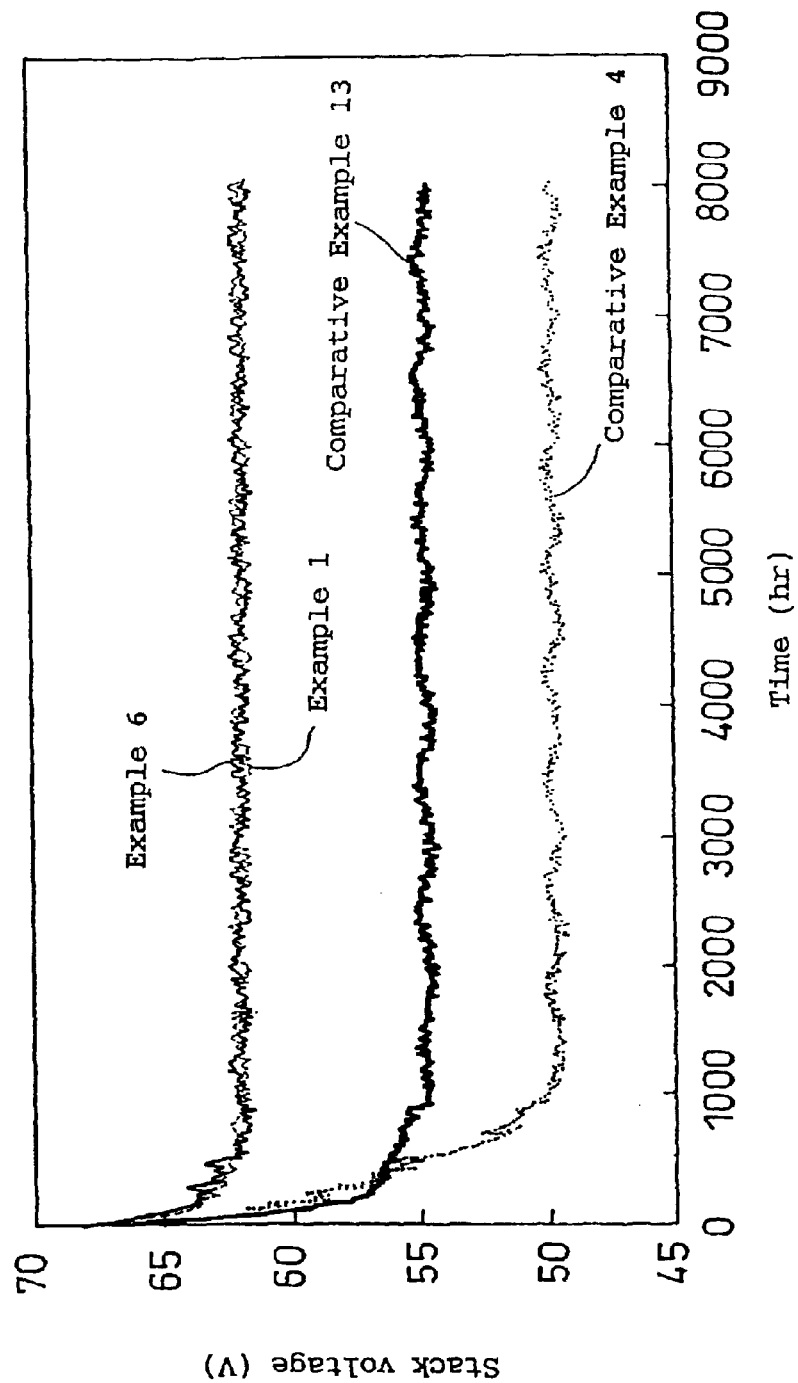
FIG. 8 shows changes with time in voltages of cell stacks of Examples of the present invention and Comparative Examples during a continuous power generation test.
Figure 9:
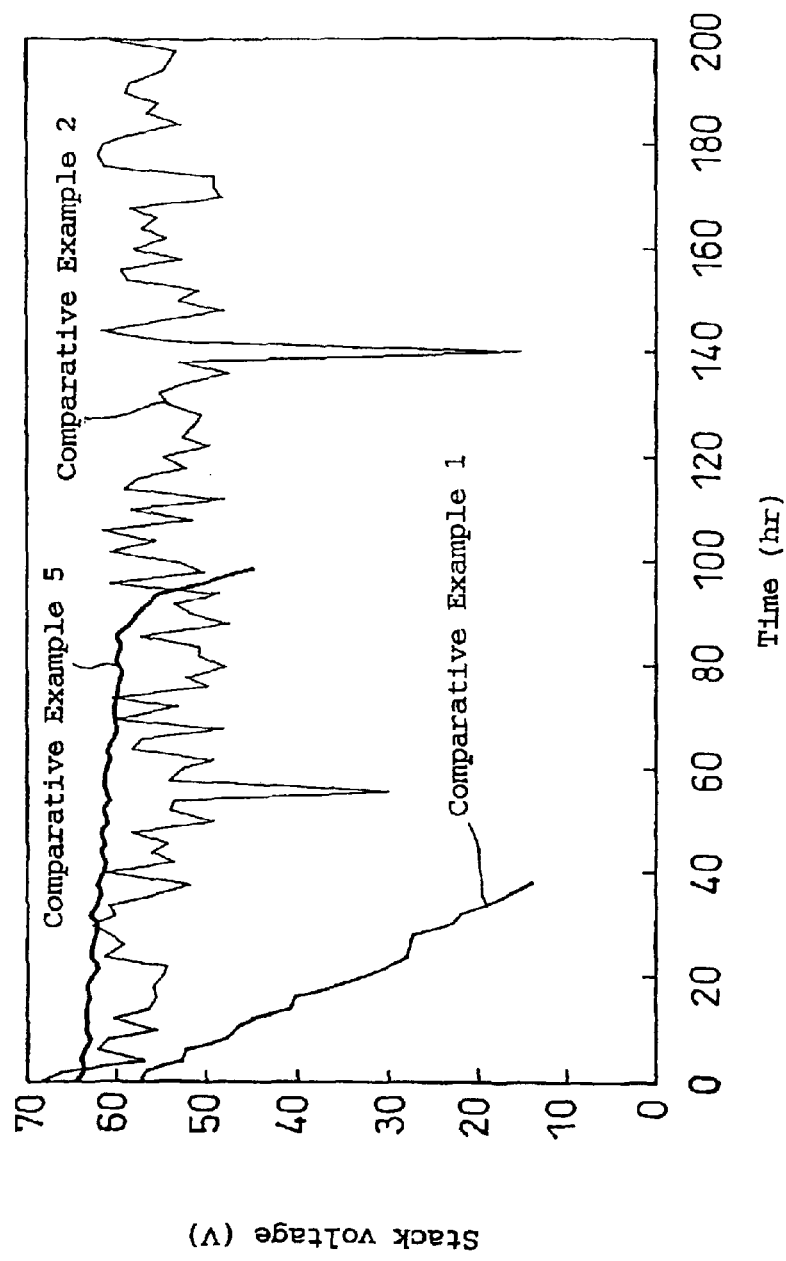
FIG. 9 shows changes with time in voltages of cell stacks of Comparative Examples during a continuous power generation test.

Table 1 shows average values of discharge characteristics, as hydrogen-air fuel cells, of the cell stacks of Examples 1 to 8 and Comparative Examples 1 to 14. FIGS. 8 and 9 show changes in voltage of some of the cell stacks with passage of time during the continuous power generation test. These cell stacks of FIGS. 8 and 9 were those which exhibited characteristic voltage behaviors.

TABLE 1

| | | Gas diffusion layer | | | | | | |
|---|---|---|---|---|---|---|---|---|
| | Kind* | Thickness before compression (mm) | Thickness of compressed portion (mm) | Protrusion into gas flow channel (mm) | Compression ratio (%) | Original porosity a (%) | Porosity of compressed portion b (%) | Ratio b/a |
| Example 1 | I | 0.36 | 0.11 | 0.25 | 30.6 | 74.0 | 14.9 | 0.20 |
| Example 2 | I | 0.36 | 0.11 | 0.25 | 30.6 | 74.0 | 14.9 | 0.20 |
| Example 3 | I | 0.36 | 0.25 | 0.11 | 69.4 | 74.0 | 62.6 | 0.85 |
| Example 4 | I | 0.36 | 0.25 | 0.11 | 69.4 | 74.0 | 62.6 | 0.85 |
| Example 5 | I | 0.36 | 0.11 | 0.25 | 30.6 | 90.0 | 67.3 | 0.75 |
| Example 6 | II | 0.20 | 0.10 | 0.10 | 50.0 | 80.0 | 60.0 | 0.75 |
| Example 7 | II | 0.20 | 0.05 | 0.15 | 25.0 | 80.0 | 20.0 | 0.25 |
| Example 8 | II | 0.20 | 0.10 | 0.10 | 50.0 | 70.0 | 40.0 | 0.57 |
| Com. Ex. 1 | I | 0.36 | 0.10 | 0.26 | 27.8 | 74.0 | 6.4 | 0.09 |
| Com. Ex. 2 | I | 0.36 | 0.11 | ~0.05 | 30.6 | 74.0 | 15.0 | 1.00 |
| Com. Ex. 3 | I | 0.36 | 0.25 | 0.11 | 69.4 | 74.0 | 62.6 | 0.85 |
| Com. Ex. 4 | I | 0.36 | 0.11 | 0.25 | 30.6 | 74.0 | 14.9 | 0.20 |
| Com. Ex. 5 | I | 0.36 | 0.25 | 0.11 | 69.4 | 74.0 | 62.6 | 0.85 |
| Com. Ex. 6 | I | 0.36 | 0.08 | 0.28 | 22.2 | 90.0 | 55.0 | 0.61 |
| Com. Ex. 7 | I | 0.36 | 0.25 | 0.11 | 69.4 | 90.0 | 85.6 | 0.95 |
| Com. Ex. 8 | I | 0.36 | 0.27 | 0.09 | 75.0 | 90.0 | 86.7 | 0.96 |
| Com. Ex. 9 | I | 0.36 | 0.11 | 0.25 | 30.6 | 65.0 | 0.0 | 0.00 |
| Com. Ex. 10 | I | 0.36 | 0.30 | 0.06 | 83.3 | 65.0 | 58.0 | 0.89 |
| Com. Ex. 11 | II | 0.20 | 0.15 | 0.05 | 75.0 | 80.0 | 73.3 | 0.92 |
| Com. Ex. 12 | II | 0.20 | 0.20 | 0.00 | 100.0 | 80.0 | 80.0 | 1.00 |
| Com. Ex. 13 | II | 0.20 | 0.05 | 0.15 | 25.0 | 70.0 | 0.0 | 0.00 |
| Com. Ex. 14 | II | 0.20 | 0.15 | 0.05 | 75.0 | 70.0 | 60.0 | 0.86 |

| | Separator plate | | | |
|---|---|---|---|---|
| | Flow channel width (mm) | Flow channel depth (mm) | Rib width (mm) | Stack voltage (V) |
| Example 1 | 1.0 | 1.0 | 1.0 | 62 |
| Example 2 | 2.0 | 2.0 | 0.5 | 63 |
| Example 3 | 1.0 | 1.0 | 1.0 | 62 |
| Example 4 | 1.0 | 1.0 | 0.5 | 62 |
| Example 5 | 2.0 | 2.0 | 0.5 | 63 |
| Example 6 | 1.0 | 1.0 | 1.0 | 62 |
| Example 7 | 1.0 | 1.0 | 1.0 | 63 |
| Example 8 | 1.0 | 1.0 | 1.0 | 62 |
| Com. Ex. 1 | 2.0 | 2.0 | 0.5 | Unable to operate |
| Com. Ex. 2 | 0.5 | 1.0 | 1.0 | Unstable |
| Com. Ex. 3 | 1.0 | 0.5 | 1.0 | Unstable |
| Com. Ex. 4 | 1.0 | 1.0 | 2.0 | 50 |
| Com. Ex. 5 | 1.0 | 1.0 | 0.3 | Shutdown of operation due to heat generation |
| Com. Ex. 6 | 2.0 | 2.0 | 0.5 | Unable to operate |
| Com. Ex. 7 | 2.0 | 2.0 | 0.5 | Unstable |

TABLE 1-continued

|  | | | | |
|---|---|---|---|---|
| Com. Ex. 5 | 2.0 | 2.0 | 0.5 | Unstable |
| Com. Ex. 9 | 2.0 | 2.0 | 0.5 | 57 |
| Com. Ex. 10 | 1.0 | 1.0 | 1.0 | Unstable |
| Com. Ex. 11 | 1.0 | 1.0 | 1.0 | Unstable |
| Com. Ex. 12 | 1.0 | 1.0 | 1.0 | Unstable |
| Com. Ex. 13 | 1.0 | 1.0 | 1.0 | 55 |
| Com. Ex. 14 | 1.0 | 1.0 | 1.0 | Unstable |

*I: Carbon fiber non-woven fabric
II: Carbon paper

As is apparent from Table 1, it was confirmed that the cells of Examples 1 to 8 maintained a voltage of approximately 62 V over more than 8000 hours. The cells of Comparative Examples 1 and 6 caused a sharp voltage drop at an early stage. When a comparison was made of the pressure loss of the cathode side reaction gas at the time of no load, the pressure losses of Comparative Examples 1 and 6 were about three times that of Comparative Example 2. At such high pressure losses, it is beyond the capacity of the testing unit to supply the reaction gas at a flow rate necessary for the operation at the oxygen utilization of 50%. Therefore, the shortage of the reaction gas is the cause of the inability to operate.

The cells of Comparative Examples 2, 3, 7, 8, 10, 11, 12 and 14 retained an output of approximately 12.8 kW (57 V–224 Å) for the first one to three hours of the continuous operation. However, thereafter, the cell voltage started to fluctuate, and the flooding phenomenon was observed due to overwetting of the cell. When a comparison was made of the pressure losses of the anode side reaction gas and the cathode side reaction gas among the cells of these Comparative Examples and Example 4, the pressure losses of these Comparative Examples were lower by 30%. This decrease in pressure loss is the cause of the flooding phenomenon, and the cause of the decrease in pressure loss is an increase in the underflow.

The cells of Comparative Examples 4, 9 and 13 were observed to operate stably, but the voltages of the cell stacks were lower than those of Examples 1 to 8 by 5 to 8 V. In Comparative Examples 9 and 13, the portion of the gas diffusion layer contacting the rib of the separator plate was compressed to a porosity of almost 0%, and hence there was no underflow. Thus, at the catalyst layer under the rib, the shortage of the supplied reaction gas promoted reaction polarization, causing a decrease in voltage. In Comparative Example 4, the rib width of the separator plate was greater than that of Example 1, so the reaction polarization was promoted at larger area of the catalyst layer, resulting in a decrease in voltage as described above.

The voltage of the cell of Comparative Example 5 was low even at the early stage of the operation, and the operation was stopped due to abnormal heat generation after the lapse of 100 hours of operation. The reason of the abnormal heat generation is as follows. Since the rib width of the separator plate was narrow, a high surface pressure was applied on the MEA, and due to creep, cross leakage occurred from minutes holes of the electrolyte membrane, resulting in burning of hydrogen.

As described above, by allowing the gas diffusion layer of the MEA to protrude into the gas flow channel of the separator plate and causing the gas flow channel to have appropriate dimensions, it is possible to suppress the flooding in the electrode while retaining good gas diffusibility and steam permeability. This makes it possible to provide an electrode and a fuel cell having high operation performance and reliability.

As described above, the present invention makes it possible to evenly supply the reaction gas to the catalyst of the catalyst layer and promptly discharge excessive water generated therein by optimizing the gas diffusion layer and the dimensions of the gas flow channel. Therefore, it is possible to realize a fuel cell having high operation performance and reliability.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A fuel cell comprising: a polymer electrolyte membrane; an anode and a cathode sandwiching the polymer electrolyte membrane; and an anode-side separator plate and a cathode-side separator plate sandwiching the anode and the cathode, the anode-side separator plate having a gas flow channel for supplying a fuel gas to the anode, the cathode-side separator plate having a gas flow channel for supplying an oxidant gas to the cathode, wherein each of the anode and the cathode comprises a catalyst layer and a gas diffusion layer, the gas diffusion layer comprises a first section having a surface A that comes in direct contact with the anode-side or cathode-side separator plate and a second section having a surface B that faces the gas flow channel of the anode-side or cathode-side separator plate, the porosity of the first section is lower than the porosity of the second section, the second section protrudes into the gas flow channel, and wherein the ratio of the porosity of the first section of the gas diffusion layer to the porosity of the second section is 0.20 to 0.85.

2. The fuel cell in accordance with claim 1, wherein the second section of the gas diffusion layer protrudes into the gas flow channel by 0.10 to 0.25 mm.

3. The fuel cell in accordance with claim 1, wherein the gas flow channel has a width of 1.0 to 2.0 mm and a depth of 1.0 to 2.0 mm, and a rib formed by the gas flow channel has a width of 0.5 to 1.0 mm.

4. The fuel cell in accordance with claim 2, wherein the gas flow channel has a width of 1.0 to 2.0 mm and a depth of 1.0 to 2.0 mm, and a rib formed by the gas flow channel has a width of 0.5 to 1.0 mm.

5. The fuel cell in accordance with claim 3, wherein the gas flow channel has a width of 1.0 to 2.0 mm and a depth of 1.0 to 2.0 mm, and a rib formed by the gas flow channel has a width of 0.5 to 1.0 mm.

6. A fuel cell comprising: a polymer electrolyte membrane; an anode and a cathode sandwiching the polymer electrolyte membrane; and an anode-side separator plate and a cathode-side separator plate sandwiching the anode and the cathode, the anode-side separator plate having a gas flow channel for supplying a fuel gas to the anode, the cathode-side separator plate having a gas flow channel for supplying an oxidant gas to the cathode, wherein each of the anode and the cathode comprises a catalyst layer and a gas diffusion layer, the gas diffusion layer comprises a first section having a surface A that comes in direct contact with the anode-side or cathode-side separator plate and a second section having a surface B that faces the gas flow channel of the anode-side or cathode-side separator plate, the porosity of the first section is lower than the porosity of the second section, and the second section protrudes into the gas flow channel, and wherein the second section of the gas diffusion layer protrudes into the gas flow channel by 0.10 to 0.25 mm.

* * * * *

UNITED STATES PATENT AND TRADEMARK OFFICE
CERTIFICATE OF CORRECTION

PATENT NO. : 6,960,407 B2 Page 1 of 1
APPLICATION NO. : 10/635692
DATED : November 1, 2005
INVENTOR(S) : Soichi Shibata et al.

It is certified that error appears in the above-identified patent and that said Letters Patent is hereby corrected as shown below:

Column 18,
Line 61, "in accordance with claim 3" should read -- in accordance with claim 6 --.

Signed and Sealed this

Fourth Day of July, 2006

JON W. DUDAS
*Director of the United States Patent and Trademark Office*